US006714022B2

(12) United States Patent
Hoffman

(10) Patent No.: US 6,714,022 B2
(45) Date of Patent: Mar. 30, 2004

(54) APPARATUS AND METHOD FOR COOLING POWER TRANSFORMERS

(76) Inventor: Gary Hoffman, 32 Phyllis Pl., Randolph, NJ (US) 07869

( * ) Notice: Subject to any disclaimer, the term of this patent is extended or adjusted under 35 U.S.C. 154(b) by 85 days.

(21) Appl. No.: 10/078,995

(22) Filed: Feb. 19, 2002

(65) Prior Publication Data

US 2002/0113599 A1 Aug. 22, 2002

Related U.S. Application Data

(60) Provisional application No. 60/269,917, filed on Feb. 20, 2001, and provisional application No. 60/271,394, filed on Feb. 26, 2001.

(51) Int. Cl.[7] .................. G01R 31/06; G08B 21/00; H02H 7/04
(52) U.S. Cl. .................. 324/547; 340/646; 361/37
(58) Field of Search .................. 324/547, 726; 340/646; 361/37; 700/300

(56) References Cited

U.S. PATENT DOCUMENTS 4,360,849 A * 11/1982 Harris et al. .................. 361/36
4,623,265 A * 11/1986 Poyser .................. 340/646
4,654,806 A * 3/1987 Poyser et al. .................. 324/726
4,754,405 A * 6/1988 Foster .................. 340/646
4,775,245 A * 10/1988 Hagerman et al. .................. 374/134
6,424,266 B1 * 7/2002 Weekes et al. .................. 340/646

* cited by examiner

*Primary Examiner*—N. Le
*Assistant Examiner*—Timothy J. Dole
(74) *Attorney, Agent, or Firm*—Henry I. Schanzer

(57) ABSTRACT

The load current drawn from a power transformer is sensed to determine if and when the load current exceeds a predetermined threshold. The length of time the load current exceeds the threshold is also sensed. By monitoring the excess current flow and the length of time for which it flows, it is possible to anticipate a rise in the winding temperature of the power transformer and to initiate cooling before the windings have reached a critical temperature, as a function of the ambient temperature and/or the temperature of the transformer. Thus, systems embodying the invention include circuitry for sensing the current drawn from and/or by a transformer, determining when the current exceeds a predetermined value and timing circuits for sensing the length of time for which the excess current flows. The timing circuits are needed, in part, to differentiate between a transitory overload condition and a static, continuous, overload condition.

22 Claims, 5 Drawing Sheets

APPARATUS AND METHOD FOR COOLING POWER TRANSFORMERS

CROSS REFERENCE TO RELATED APPLICATIONS

This application claims priority from: (a) provisional patent application Ser. No. 60/269,917 for Power Transformer Cooling Control Device filed Feb. 20, 2001 by Gary R. Hoffman; and (b) provisional patent application Ser. No. 60/271,394 for Adaptive Power Transformer Cooling Control Device filed Feb. 26, 2001 by Gary R. Hoffman.

BACKGROUND OF THE INVENTION

This invention relates to apparatus and methods for cooling power transformers.

Electric utilities use large power transformers to distribute power (voltage and current) along and within their distribution territory. These "power" transformers handle large amounts of power (e.g. 10 million volt-amperes—10 MVA) and are normally made to have very low winding resistance (Rw). However, at elevated load currents (I), the power dissipation ($I^2$Rw losses) in the transformer winding translate into the generation of large amounts of heat which in turn causes the temperature of the power transformer to rise. Accordingly, the temperature of these power transformers increases as a function of the load (power drawn from the transformer) and ambient temperature.

The power drawn through a transformer may increase significantly due to a fault on a distribution line or some other overload condition. In addition, a large increase in the power drawn through a power transformer may occur due to certain operating procedures as illustrated with reference to FIGS. 1 and 2.

FIG. 1 shows a block diagram of a substation 10 used to distribute power from a primary source 12 to various loads connected to the substation. Input power from source 12 is coupled via circuit breaker CB1 to a transformer T1 and is distributed via a closed switch SW1 to a station bus section line 14 from which power is then distributed via circuit breakers CB4 and CB5 to feeder lines F1A and F1B to which loads L1 and L2 are, respectively, connected. Likewise, input power coupled via circuit breaker CB2 to a transformer T2 is distributed via a closed switch SW2 to a station bus section 16 from which power is then distributed via circuit breakers CB6 and CB7 to feeder lines F2A and F2B to which loads L3 and L4 are, respectively, connected.

From time to time the load from one transformer (e.g., T2) is switched to another transformer (e.g., T1) in accordance with some standard operating procedure, e.g., whenever it is necessary to service power lines or equipment inside and/or outside the substation. By way of example, this is illustrated with reference to FIG. 2 when switch SW2 is opened and bus tie breaker CB3 is closed. Then, all the currents for loads L1 through L4 are drawn from T1. Because of the increased loading on the transformer (e.g., T1), the temperature of the transformer will increase with time and may rise above the ambient temperature by a significant amount. Insofar as T1 is concerned this load condition would represent a "high" load condition.

Conventional cooling systems rely on sensing the temperature of the power transformer and/or other points representative of the actual transformer temperature. If and when the temperature being sensed rises above a predetermined level, a cooling system is activated; where, for example, the cooling system may include banks of fans blowing air over the transformer or pumps causing cooling oil to be circulated about the transformer windings. However, it should be noted that the power transformers are physically massive devices which have large thermal time constants (e.g., one-half hour). Thus, by the time the free air maximum rating temperature of the transformer is sensed and the cooling system is activated, the temperature of the winding will continue to rise and may exceed the "rating" temperature of the transformer. The temperature of the transformer and its windings may thus continue to rise above critical values giving rise to "service life" problems, as discussed below.

It is important to maintain the temperature of a power transformer at, or below, certain specified temperature ratings because the service life of the transformer is reduced when these specified temperature ratings are exceeded. By way of example, at elevated temperatures the winding insulation begins to breakdown Also, the circulating oil may break down and/or volatile gases may be produced creating potentially hazardous conditions. To ensure that the temperature rating of the transformer is not exceeded a variety of cooling systems (e.g., forced air or circulating oil) may be used, as already noted, to ensure that the winding temperature of the transformer stays below its specified ratings.

As noted above, known methods for controlling the temperature of a power transformer includes sensing the temperature of the transformer and/or making direct temperature measurements of selected points associated with the transformer and then turning on fans for blowing air onto the transformers or causing cooling oil to be circulated. This is not satisfactory because of the potentially large thermal overshoots.

It should also be appreciated that operating the cooling system on a continuous basis is expensive and increases the wear and tear on the cooling equipment. Therefore, it is undesirable to operate the cooling system continuously if such operation is not needed. On the other hand, as just noted, the delay in energizing the cooling system causes the temperature to overshoot which in turn reduces the life of the transformer.

SUMMARY OF THE INVENTION

The problems present in the prior art are mitigated using apparatus and methods embodying the invention. In accordance with the invention the load current drawn from a power transformer is sensed (by sensing the current in the primary or secondary of the transformer) to determine if and when the current exceeds a predetermined threshold. The length of time the load current exceeds the threshold is also sensed. By monitoring the excess current flow and the length of time for which it flows, it is possible to anticipate a rise in the temperature of the transformer and in its winding and to initiate cooling before the transformer and its windings have reached a critical temperature. Thus, systems embodying the invention include means for sensing the current drawn from and/or by a transformer, determining when the current exceeds a predetermined value and timing means for sensing the length of time for which the excess current flows. The timing means are needed, in part, to differentiate between a transitory overload condition and a static, continuous, high load condition.

Applicant's invention thus bypasses the long thermal time constant and enables an appropriate cooling response to be initiated at an early point of a heat cycle which can prevent the transformer temperature from rising significantly above its rated value, thereby extending the useful life of the transformer.

Thus, in systems embodying the invention the turn-on of the cooling system is made a function of the electrical power dissipation which causes heat dissipation which in turn causes a rise in the temperature of the transformer. This is in sharp contrast to the prior art schemes where the temperature of various surfaces or items is sensed to determine when the cooling system is to be turned on.

BRIEF DESCRIPTION OF THE DRAWINGS

In the accompanying drawings like reference characters denote like components.

DETAILED DESCRIPTION OF THE INVENTION

Figure 1:
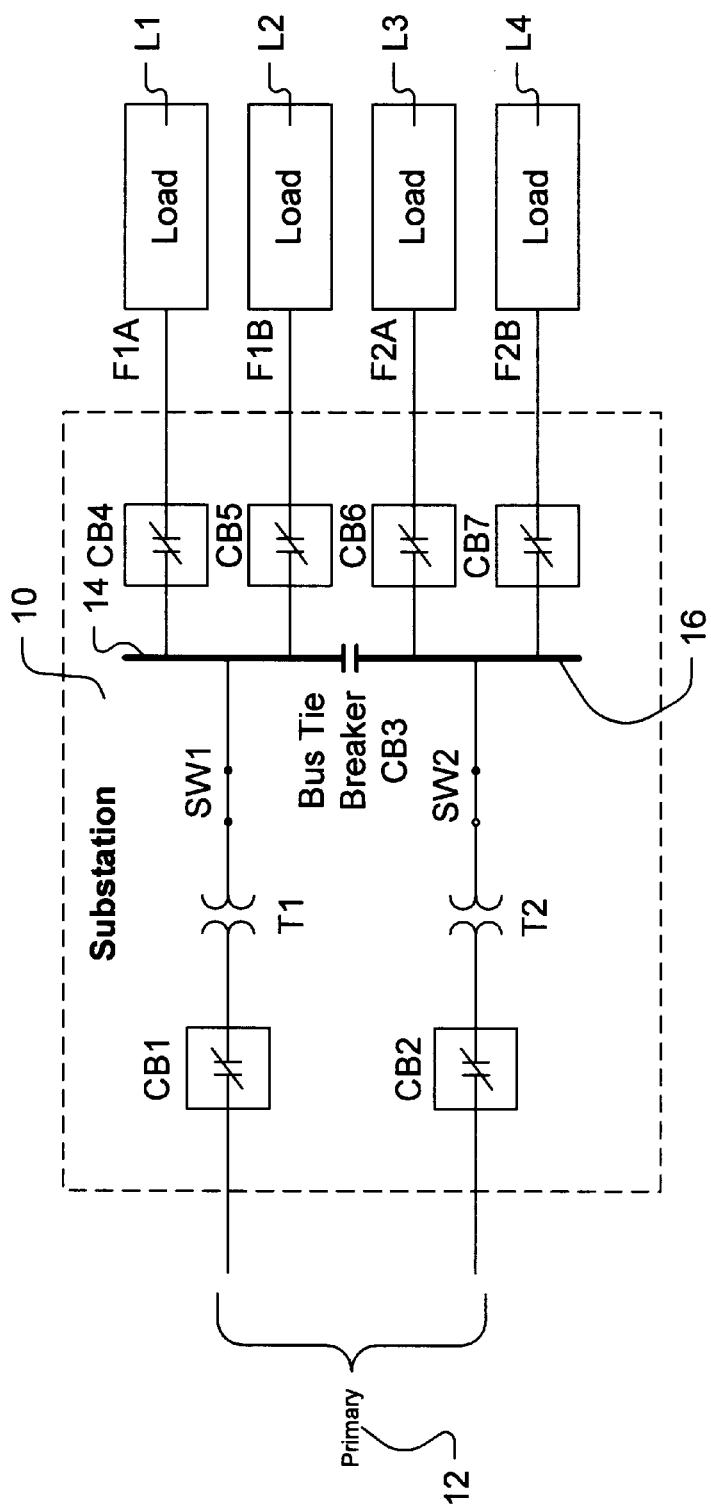
FIG. 1 is a block diagram of a substation distribution system.
Figure 2:
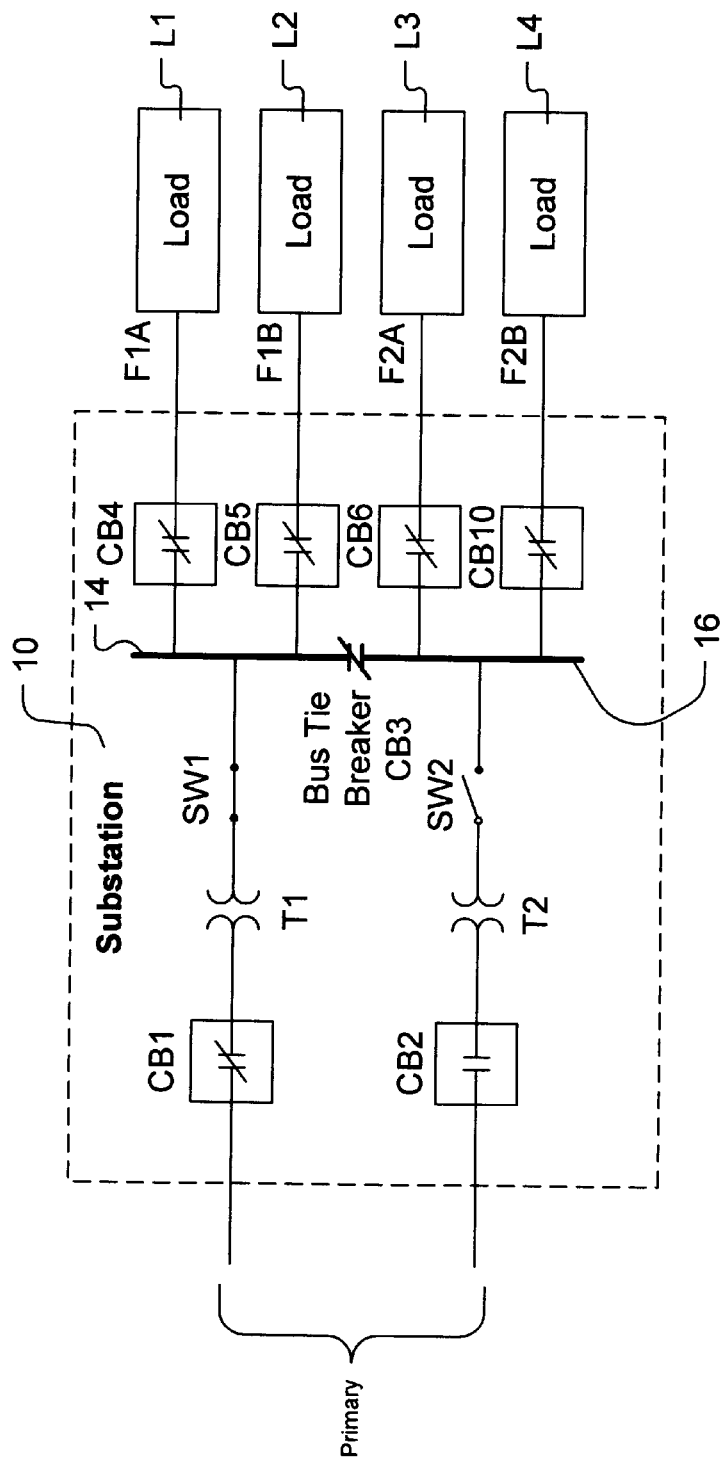
FIG. 2 is a block diagram illustrating a problem associated with the distribution system of FIG. 1.
Figure 3:
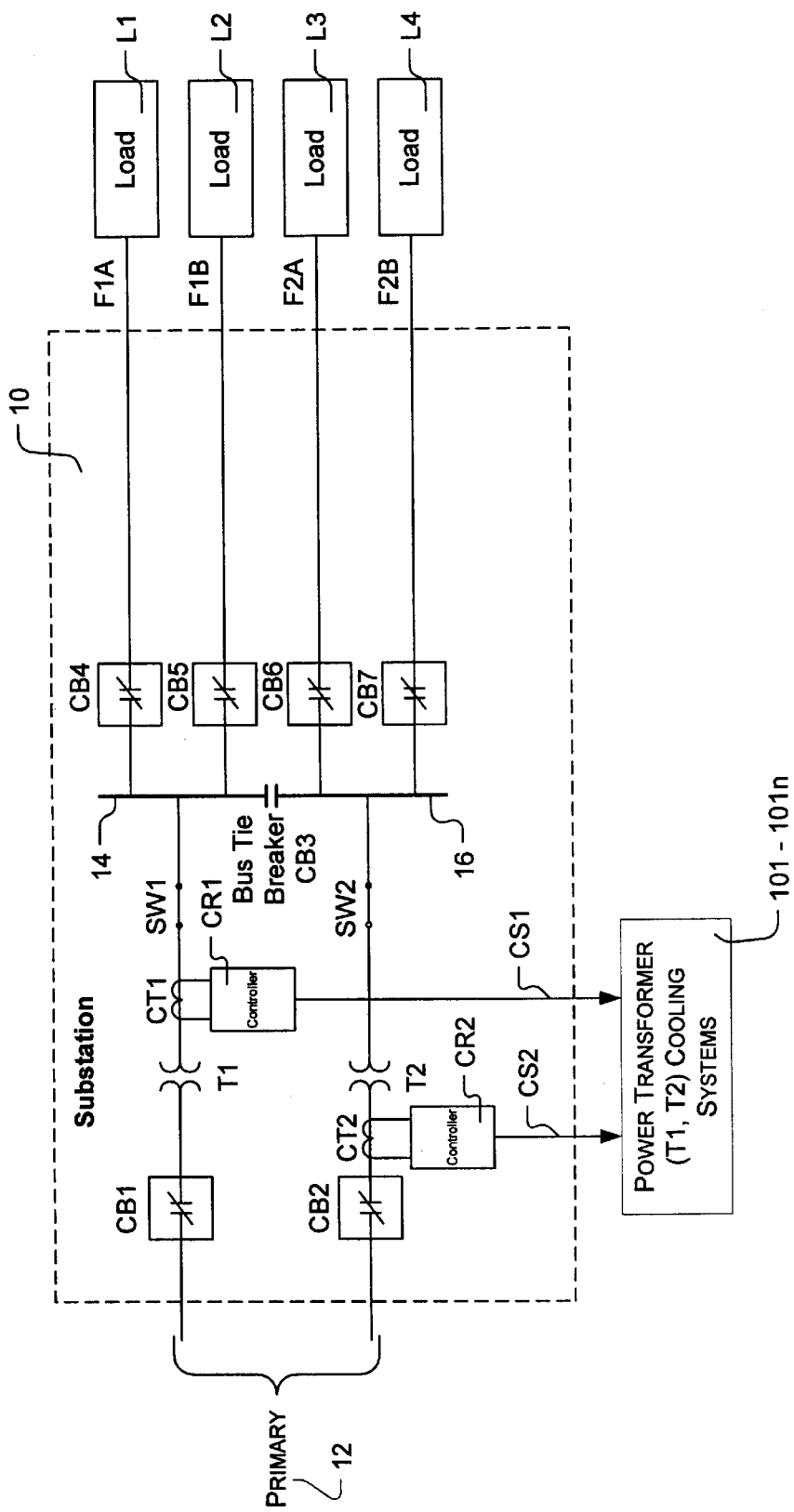
FIG. 3 is a block diagram of a substation distribution system embodying the invention.

FIG. 3 shows a substation 10 in which, in accordance with the invention, a current transformer CT1 is coupled in the secondary leg of transformer T1 to sense the load current drawn out of T1 and the output of CT1 is supplied to a controller CR1 which includes means for sensing the amplitude of the load current and a timer for sensing the length of time "excessive" currents are drawn. FIG. 3 also shows a current transformer CT2 coupled in the primary leg of transformer T2 to sense the amplitude of the current drawn by T2. The output of CT2 is supplied to a controller CR2 which, like CR1, includes means for sensing the amplitude of the load current and a timer for sensing the length of time "excessive" currents are drawn. This illustrates that the invention may be practiced with current sensing means sensing the load current in the primary or secondary side of the power transformers (e.g., T1, T2). In systems embodying the invention, controllers CR1, CR2 produce output signals CS1, CS2 which may be used to initiate the turn on of the power transformer cooling system 101. The cooling system is turned-on as a function of the load current level in the power transformer, the ambient temperature about the power transformer (or some equivalent temperature point) and on the basis of the length of time excess load currents are sensed to flow in the primary or secondary side of the power transformers (e.g., T1, T2). Current transformers CT1 and CT2 may be of the same or similar type to each other. Likewise, controllers CR1 and CR2 may be of the same or similar type.

Figure 4:
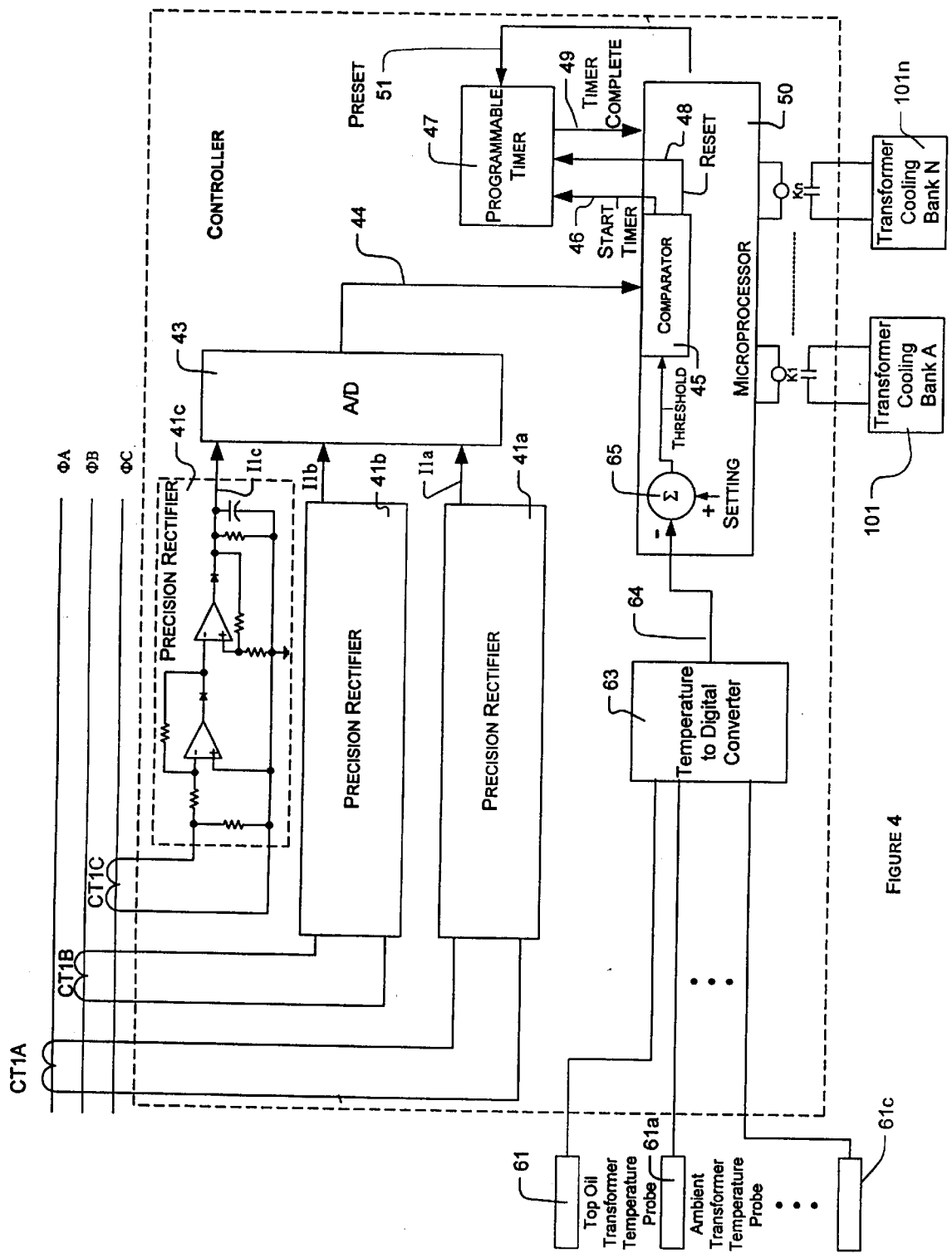
FIG. 4 is a more detailed block diagram of a controller system for use in the circuit of FIG. 4.

A more detailed diagram of a current transformer (e.g., CT1) and an associated controller (e.g., CR1) is shown in FIG. 4. In FIG. 4 it is assumed that transformer T1 has three phases ($\phi A$, $\phi B$, $\phi C$) and that a current transformer (CT1A, CT1B, CT1C) is coupled to each leg of the transformer to sense the current drawn in each transformer leg. In FIG. 4 the output of each current transformer (e.g., CT1A, CT1B, CT1C) is fed to a corresponding precision rectifier (41a, 41b, 41c) which rectifies the AC current of each current transformer into a corresponding direct current (D.C.) level. In FIG. 4 all three phases are continuously sensed and rectified. However, it is possible to sense and rectify just one of the three phases and assume that the other two phases behave in a similar manner to the sensed phase. The rectified output currents (11a, 11b, 11c) are applied to an analog-to-digital converter (A/D) 43 which converts the sensed and rectified current levels into corresponding digital signals. The current signal levels at the output of A/D 43 are compared against a predetermined threshold level applied to a comparator 45. The threshold level may be set to have a value which if exceeded is indicative that too much load current is being drawn and that as a result there will be an increase in transformer temperature. The value of the threshold level may be predetermined and/or, as discussed below, it may be varied as a function of the ambient temperature and/or the transformer temperature.

If the current signal level at the output 44 of A/D 43 which is applied to an input of comparator 45 exceeds the threshold level, the comparator 45 produces a start timer output signal, 46, which is applied to a programmable timer circuit 47. The start timer signal, indicates that the load current drawn from the transformer exceeds a desirable threshold level and starts the timer 47 counting. The timer 47 (unless its counting is terminated by a reset/stop counting signal on line 48) is preprogrammed or set to count for a predetermined period, TF. It is assumed that if the over-current condition exists for a period in excess of TF that the temperature of the transformer winding will eventually exceed a desired and/or rated value. Thus, if the timer is not stopped before a period TF, the timer produces a timer complete signal 49 which is applied to microprocessor 50. It should be appreciated that the timer 47 also functions as a filter since over-current conditions which last for less than a predetermined length of time are effectively filtered out.

In response to a timer complete signal, the processor 50 is programmed to energize one or more stages of transformer cooling fans K1 through KN as shown in FIG. 4. The microprocessor 50 may be used to turn on any one or all of the cooling control relays K1–KN based on whether the transformer temperature is less than a pre-programmed set point and/or the duration of the over-current condition. Cooling systems may include "N" banks of fans (e.g., 101 to 101n) and/or additional apparatus for cooling the power transformers. Thus, depending on the level of power being drawn it is possible to control which banks of fans are turned on and to turn them on gradually as a function of how long the over-current condition persists.

After one or more of the cooling fans (K1 through KN) are energized, the microprocessor continues to monitor the load current and the transformer temperature. Circuitry within the processor 50 and/or other comparator stages may be used to sense whether the "high" current condition persists for given periods of time which exceed TF or are multiples of TF. If the over-current condition persists, then the processor can enable additional banks of fans and transformer coolers. Microprocessor 50 may be used to "set" or "load" the programmable timer via a line 51, as shown in FIG. 4.

The system may include a "top oil" transformer temperature probe 61, an ambient transformer temperature probe 61a to measure the air surrounding the power transformer (e.g., T1, T2) and/or any number of other probes (e.g., 61c) for measuring the temperature of the power transformer itself or associated points. The outputs of these temperature probes are supplied (fed) to a temperature to digital signal converter 63 whose output 64 is then fed to a threshold setting circuit 65. Threshold setting circuit 65, in response to the outputs from circuit 63 and signals from processor 50, establishes the threshold level applied to comparator 45. Thus, the threshold may be set by the processor 50 and may be a function of various temperature signals generated by the temperature probes. The processor 50 also continuously monitors the threshold level value. For conditions where the "transformer" temperature is very low (e.g., when the ambient temperature is very low) the threshold level to comparator 45 may be varied (e.g., raised). Alternatively, the transformer temperature, if below some value, may negate the need for responding to a "high" or "over" current load condition unless the excess current is above some value and/or is drawn for a significantly longer period of time (e.g., much longer than TF).

The precision rectifiers, the A/D converter, the comparator 45 and the timer 47 may be part of processor 50 or may be individual components, external to the processor, coupled to processor 50.

In FIG. 4, banks of cooling fans are used but it should be understood that this is by way of example only and any other suitable cooling means (e.g., pumps causing circulating oil to flow) may be used in systems embodying the invention.

Figure 5:
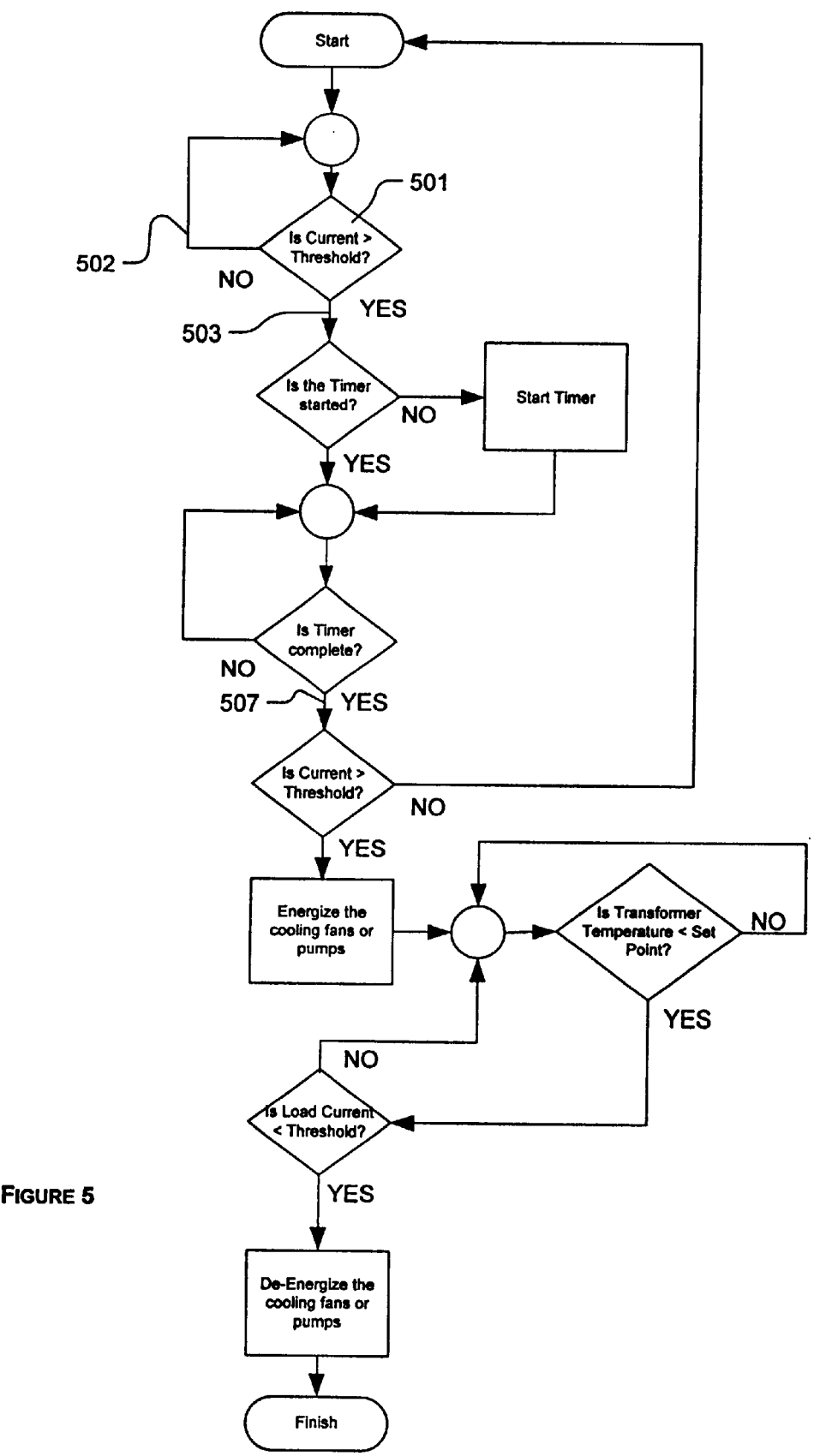
FIG. 5 is a flow chart of a method embodying the invention.

FIG. 5 illustrates a sequence of operations of the system in accordance with the invention. As indicated by box 501, comparator 45 constantly compares the value of the load current drawn from the power transformer versus a threshold level. If the threshold is not exceeded the comparator output (502) inhibits the timer 47. If the load current exceeds the threshold level, then the comparator output (503) causes the timer 47 to start counting and to continue counting until the timer has counted for a full time period TF (507). The processor compares the sensed transformer current with the threshold at the end of the period TF to determine whether or not the threshold is exceeded. In systems embodying the invention circuitry (including a current transformer, a comparator, a timer and processing circuitry) is used to sense the power transformer (e.g., T1, T2) load current and to compare it to a threshold level throughout and at the end of a period TF. If the threshold is not exceeded then the counting process is begun all over again. If the threshold is still exceeded, then cooling fans or pumps for the cooling oil are energized. If the load current is less than the threshold current the processor deenergizes the cooling fans and/or the circulating oil pumps.

What is claimed is:

1. In an electrical power system including a power transformer which may be subjected to a load condition causing the temperature of the power transformer to rise above a desired level, the combination comprising:

means for sensing the amplitude of one of the load current flowing into the power transformer and the load current flowing out of the power transformer and for constantly comparing the amplitude of said load current with a predetermined threshold level and producing a first over-threshold signal whenever the load current exceeds the threshold level; and means including a timing circuit responsive to said first over-threshold signal for initiating a predetermined counting period and said timing circuit being responsive to the first over-threshold signal persisting throughout said predetermined counting period for, at the end of said predetermined counting period producing a second signal for enabling a cooling system for cooling the power transformer.

2. In an electrical power system as claimed in claim 1, wherein the means for sensing and comparing the load current includes means for sensing at least one of the ambient temperature surrounding the power transformer and the power transformer temperature for setting the threshold level as a function of at least one of the ambient temperature and the power transformer temperature.

3. In an electrical power system as claimed in claim 2, wherein said means for sensing and comparing the amplitude of the load current includes a current transformer coupled to the power transformer and means for converting signals generated by the current transformer into digital signals and applying said digital signals to a comparator to which is also applied said threshold level for constantly comparing the sensed load current with the threshold level.

4. In an electrical power system as claimed in claim 3, wherein said timing circuit is responsive to signals generated by said comparator and wherein said means including a timing circuit includes processing means responsive to signals generated by said timing circuit for producing said second signal enabling said cooling system.

5. In an electrical power system as claimed in claim 1 wherein said power transformer includes a primary to which input power is supplied and a secondary to which a load is coupled; and wherein said means for sensing the amplitude of one of the load current flowing into the power transformer and the load current flowing out of the power transformer includes a current transformer coupled to the primary of the power transformer for sensing the load current in the secondary.

6. In an electrical power system as claimed in claim 1 wherein said power transformer includes a primary circuit to which input power is supplied and a secondary circuit to which a load is coupled; and wherein said means for sensing the amplitude of one of the load current flowing into the power transformer and the load current flowing out of the power transformer includes a current transformer coupled to the secondary circuit for sensing the load current drawn from the secondary circuit.

7. In an electrical power system as claimed in claim 6, wherein said current transformer is coupled to a controller circuit which includes; (a) comparator circuitry for constantly comparing the load current to said threshold level; and (b) a programmable timing circuit and processing circuitry responsive to constant output signals produced by said comparator circuitry for controlling the cooling applied to the power transformer.

8. In an electrical power system as claimed in claim 3, wherein said current transformer is coupled to a controller circuit including comparator, timing and processing circuitry, and wherein said controller circuit is coupled to said cooling system for selectively enabling the cooling system.

9. In an electrical power system including a power transformer which may be subjected to a load condition causing the temperature of the power transformer to rise above a desired level, the combination comprising:

temperature responsive circuitry for sensing the temperature of at least one of the power transformer and the ambient surrounding the power transformer for generating a threshold level which is a function of the sensed temperature;

circuitry coupled to the power transformer for sensing the amplitude of the load current flowing in the power transformer said circuitry including comparator and timing circuits for constantly comparing the sensed load current with said threshold level and for triggering said timing circuit into a counting mode whenever the load current exceeds the threshold level, and said timing circuit for generating signals enabling a cooling system and applying cooling to the power transformer when the load current exceeds the threshold level for longer than a predetermined time period.

10. In an electric system as claimed in claim 9, wherein said power transformer has a primary and a secondary and wherein said circuitry coupled to the power transformer for sensing the amplitude of the load current flowing in the power transformer includes a current transformer coupled to the primary of the power transformer for sensing the load current drawn out of the secondary.

11. In an electric system as claimed in claim 9, wherein said power transformer has a primary and a secondary and wherein said circuitry coupled to the power transformer for sensing the amplitude of the load current flowing in the power transformer includes a current transformer coupled to the secondary of the power transformer for sensing the load current drawn out of the secondary.

12. A combination comprising:
   a power transformer having a primary for the application thereto of input power and having a secondary for the connection of a load thereto;
   circuitry for sensing the amplitude of the load current in the power transformer including comparator circuitry for constantly comparing the load current with a predetermined threshold level and producing a first signal whenever the load current exceeds the threshold level; and
   circuitry for applying the first signal to a timing circuit for initiating a predetermined counting period; said timing circuit counting so long as said first signal persists, and said timing circuit if not reset before the end of the predetermined counting period, for producing a second signal for enabling a cooling system for cooling the power transformer.

13. The combination as claimed in claim 12 wherein the circuitry for sensing the amplitude of the load current includes a current transformer coupled to the primary of the power transformer.

14. The combination as claimed in claim 12 wherein the circuitry for sensing the amplitude of the load current includes a current transformer coupled to the secondary of the power transformer.

15. The combination as claimed in claim 12 wherein said predetermined threshold level is set as a function of at least one of the ambient temperature and the temperature of the power transformer.

16. The combination as claimed in claim 12 wherein the cooling system includes a number of cooling stages and wherein a greater number of cooling stages are enabled as a function of increasing temperature and load current.

17. A method for cooling a power transformer which may be subjected to a load condition causing the temperature of the power transformer to rise above a desired level, the method comprising the steps of:
   sensing the amplitude of the load current in the power transformer;
   constantly comparing the sensed load current with a predetermined threshold level;
   producing a first signal whenever the load current exceeds the threshold level;
   counting the length of time the first signal is present; where the first signal indicates that the load current exceeds the threshold level; and
   in response to the load current exceeding the threshold level for longer than a predetermined period enabling a cooling system for cooling the power transformer.

18. The method as claimed in claim 17, wherein the step of comparing the sensed load current with a predetermined threshold level includes the step of setting the threshold level as a function of at least one of the ambient temperature surrounding the power transformer and the power transformer temperature.

19. The method as claimed in claim 17, wherein the step of sensing the current in the power transformer includes the step of sensing the load current using a current transformer coupled to the power transformer and the step of converting signals generated by the current transformer into digital signals and applying said digital signals to a comparator to which is also applied said threshold level.

20. The method as claimed in claim 19, wherein the step of counting the length of time the load current exceeds the threshold level includes using a timing circuit and processing means responsive to signals generated by said timing circuit for producing a second signal enabling said cooling system.

21. The method as claimed in claim 19, wherein the step of sensing the current in the power transformer includes the step of sensing the load current using a current transformer coupled to the primary of the power transformer.

22. The method as claimed in claim 19, wherein the step of sensing the current in the power transformer includes the step of sensing the load current using a current transformer coupled to the secondary of the power transformer.

* * * * *